United States Patent
Fallin et al.

(10) Patent No.: US 11,094,134 B1
(45) Date of Patent: Aug. 17, 2021

(54) SYSTEM AND METHOD FOR GENERATING SYNTHETIC DATA

(71) Applicant: Booz Allen Hamilton Inc., McLean, VA (US)

(72) Inventors: Brandon Fallin, Lusby, MD (US); Dave Babbitt, Clinton, MA (US); Rory Thomas Burke, Arlington, VA (US); Paul McLone Carson, California, MD (US); Cornelius Griggs, Alexandria, VA (US); Kevin Green, Aldie, VA (US); Andrew Kalukin, Arlington, VA (US); Andre Tai Nguyen, Columbia, MD (US); David Sanborn, North Charleston, SC (US); Douglas James Sanborn, Leonardtown, MD (US); Jacob Stevens-Haas, Bellevue, WA (US); Alexander Tejada, Arlington, VA (US); James J. Ter Beest, Washington, DC (US); Michael Tong, Arlington, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 16/992,285

(22) Filed: Aug. 13, 2020

(51) Int. Cl.
*G06T 19/00* (2011.01)
*G06T 11/00* (2006.01)

(52) U.S. Cl.
CPC ............ *G06T 19/006* (2013.01); *G06T 11/00* (2013.01)

(58) Field of Classification Search
None
See application file for complete search history.

(56) References Cited

U.S. PATENT DOCUMENTS

| | | | |
|---|---|---|---|
| 10,950,036 B2 * | 3/2021 | Ha | G06T 7/50 |
| 2007/0098290 A1 * | 5/2007 | Wells | G06T 15/50 |
| | | | 382/254 |

(Continued)

OTHER PUBLICATIONS

Welch et al., Motion Tracking: No Silver Bullet, but a Respectable Arsenal, Dec. 2002, IEEE Computer Graphics and Applications, 24-38 (Year: 2002).*

(Continued)

*Primary Examiner* — Robert J Craddock
(74) *Attorney, Agent, or Firm* — Buchanan Ingersoll & Rooney PC

(57) ABSTRACT

Exemplary systems and methods are directed to generating synthetic data for computer vision. A processing device generates a synthetic three-dimensional (3D) image of an object. A background image is selected, and a composite image is generated by combining the 3D image of the object and the background image. The processing device simulates: reflection or emission of at least one type of radiant energy from the surface of the object and/or the background according to a set of parameters associated with at least one of the object and the background image; and a reflectance or emittance measurement of the at least one type of radiant energy from the surface of the object by a sensor device configured for detecting the at least one type of radiant energy. The processing device generates a plurality of two-dimensional (2D) simulated images of different perspectives of the object based on simulation data.

21 Claims, 8 Drawing Sheets

(56) References Cited

U.S. PATENT DOCUMENTS

2017/0278289 A1* 9/2017 Marino .................. G06T 11/60
2019/0303555 A1* 10/2019 Agarwal ................ G06T 15/04

OTHER PUBLICATIONS

Matchmover, MatchMover User Guide, Dec. 2010, 1-262, retrieved from: http://images.autodesk.com/adsk/files/matchmoveruserguide2011.pdf (Year: 2010).*

* cited by examiner

SYSTEM AND METHOD FOR GENERATING SYNTHETIC DATA

FIELD

The present disclosure relates to systems and methods for generating synthetic data for computer vision.

BACKGROUND

Computer Vision is a rapidly emerging and powerful Artificial Intelligence-based tool used to automate pattern recognition of many types of imagery based on radiant energy such as Electro Optical InfraRed (EOIR) and Synthetic Aperture Radar (SAR) sensor outputs. Graphical outputs may represent reflected visual spectrum (e.g., human-observable photographs), reflected light beyond human spectrum (e.g., ultraviolet), emitted light such as thermal imagery, or reflected electro-magnetic waves (from radar). The digital outputs from these sensors consist of pixel-based files, which form recognizable patterns of the objects being sensed. The recognizable pattern being comprised of a plurality of pixels, each having a specified measurable value determined from the intensity of the detected radiant energy. The image files can be classified as number arrays which can be compared against known image models in a computer vision application. The models are created from thousands of representative labeled examples from a dataset. In practice, the models can be rapidly compared against a sample image using graphical processor units (GPUs) and sophisticated neural network-based algorithms. In known computer vision applications, the neural network algorithms determine a probability of whether a pattern exists, calculate the percent confidence of a match, and earmark the location of the pattern within the sample image using a bounding polygon.

The problem in this practice is that training Computer Vison (CV) models require robust volumes of pre-labeled empirical imagery in order to achieve adequate pattern detection and classification results. Without a sufficient supply or access to pre-trained imagery, existing computer vision solutions are ill-equipped to support real-world applications where empirical examples are not available or limited in perspectives (e.g., spatial, environmental, spectral, or depth).

SUMMARY

An exemplary method for generating synthetic data for computer vision is disclosed, comprising: generating, via a processing device, a synthetic three-dimensional (3D) image of an object; selecting a background image; generating, in the processing device, a composite image by combining the 3D image of the object and the background image; simulating, in the processing device: reflection of at least one type of radiant energy from the surface of the object and/or from the background according to a set of parameters associated with at least one of the object and the background image; and a reflectance measurement of the at least one type of radiant energy from the surface of the object by a sensor device configured for detecting the at least one type of radiant energy; and generating, via the processing device, one or more two-dimensional (2D) simulated images of different perspectives of the object based on simulation data.

An exemplary computing system is disclosed, comprising: a processing device configured to generate a composite image based on a synthetic 3D rendering of an object and a background image depicting an environment in which the object is located, simulate a reflectance measurement of radiant energy reflected from the object by one or more sensor devices, and generate a plurality of two-dimensional simulated images of different perspectives of the object based on a simulation result.

BRIEF DESCRIPTION OF THE DRAWINGS

Exemplary embodiments are best understood from the following detailed description when read in conjunction with the accompanying drawings. Included in the drawings are the following figures.

Figure 1:
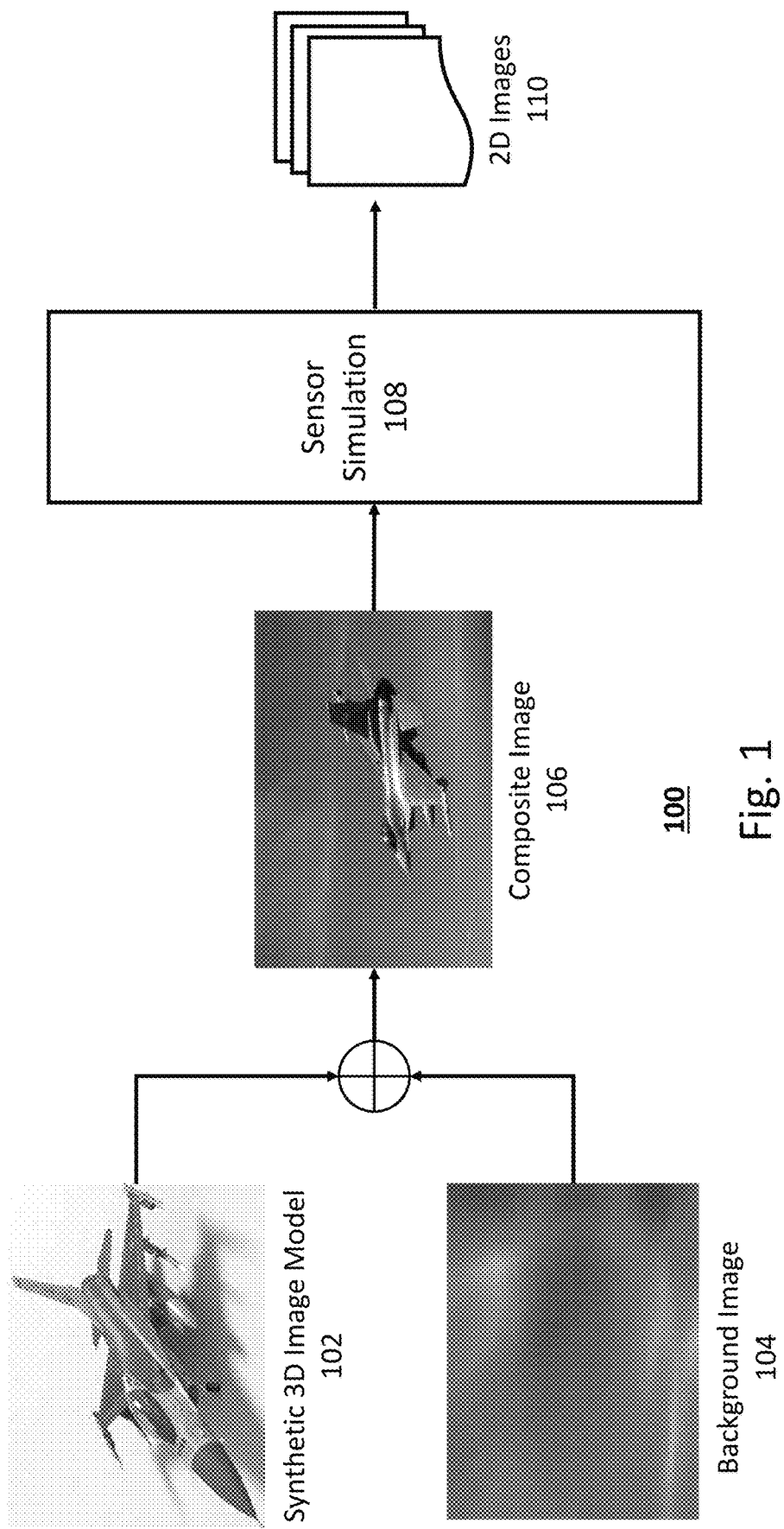
FIG. 1 illustrates a flow diagram of synthetic image generation according to an exemplary embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Exemplary embodiments of the present disclosure provide a computing system and method that synthetically creates imagery to simulate real-world (e.g., realistic) and usefully non-real world (e.g., unrealistic) examples of physical objects and/or assets. Usefully non-real-world examples can include images of objects in unrealistic scenes and/or scenarios, such as a hot pink F-18 fighter jet in a bedroom surrounded by oddly-colored polygons. The exemplary system and methods described herein are configured to develop models under circumstances in which robust empirical examples that are used to label images and train for recognition, tracking, and/or detection do not exist or have insufficient detail or scope. As in the case in which non-real-world examples are used, the exemplary systems and methods can be trained to identify objects, such as the F-18 fighter jet, even outside of their natural environments. The exemplary embodiments described herein can include one or more computing devices configured to execute or access one or more software applications or software modules which model three-dimensional objects using Computer Aided Design (3D CAD) software packages. The software applications can render the physical object or asset using life-like representative qualities which real-world sensors would recognize in the form radiant energy reflected from the surface or features of the object. These representative qualities can include, for example, reflected light in the form of color, texture, reflections, diffusions, refractions or emitted light and electromagnetic wave emissions of varying frequencies like x-ray, or any other suitable format for measurement as desired.

The exemplary embodiments described herein can generate a virtual model of a physical object or asset where interaction of the virtual model with any number of virtual environments can be simulated based on real-world geographical and/or topological characteristics and features of the selected environment. The virtual environment can be established through the selection of one or more background images obtained from real-life imagery or synthetically-created imagery to randomize or represent actual geographic or topological areas where one or more computer vision sensors may be situated (but trained to differentiate from the object). In this manner, the systems and methods of the present disclosure provide a uniquely advantageous concept for training a computer vision model so that computer vision applications executed by processing systems can accurately detect physical assets when deployed in real-world operations.

The generation of a virtual model through the exemplary embodiments described herein can provide advantages over known computer vision systems in that the inventive concepts consider synthetic images, scenes, and scenarios of objects that would not normally be included in computer vision training processes because of outlier or anomalous characteristics that may be infrequent in real-world situations. For example, known computer vision systems typically convert objects under analysis or observation to a plurality of points. Generally, the plurality of points, which can define object characteristics such as color, sound, shape, size, depth, etc., are plotted in a multi-dimensional coordinate system typically having three or more dimensions. As the dimensions increase, the distance between pairs of points becomes less pronounced. Consequently, it becomes more difficult to distinguish differences between pairs of points among plural images since nearly every point is the same or approximately the same distance apart from every other point. The synthetic image synthesis operations performed by the exemplary embodiments of the present disclosure produce object models trained using a domain having a cloud of points encompassing realistic synthetic images of an object in various real-world scenes and scenarios as well as a domain having a cloud of points encompassing unrealistic, domain-randomized synthetic images of an object in non-real-world scenes and scenarios. As a result, the object model of the present disclosure encompasses a greater percentage of possible true images than is provided by known computer vision systems, which are trained only with non-synthetic realistic or real-world images or scenes of objects where an operator modifies various pixels in the image to generate synthetic data. The object model of the present disclosure provides sufficient overlap with real-world images and addresses real-world random distribution challenges by generating a high probability of uniform samples where all points are equally likely to occur.

FIG. 1 illustrates a flow diagram of synthetic image generation according to an exemplary embodiment of the present disclosure.

As shown in FIG. 1, a processing device can be configured to execute a process which includes generating, a synthetic three-dimensional (3D) image 102 of a physical object or asset. The image can be generated using one or more software applications or program code executed or accessed by a processing or computing device. The one or more software applications can be configured as one or more tools based in mechanical and/or electronic design automation, and computer-aided drafting (CAD) for generating a technical drawing or image model of a physical object or asset. The computing device via the one or more software applications can be configured to generate a 3D image or representation of any real-world object or physical asset as desired. The object or physical asset can include, for example, a vehicle such as an airplane, train, car, truck, boat, ship, industrial or construction heavy equipment, a movable or immovable building or structure, or any other real-world object or physical asset composed of one or more real-world objects as desired. The processing device 100 can also be configured to select a background image 104. The background image 104 can include one or more actual images taken or obtained in a natural environment by one or more image sensors such as a camera. According to an exemplary embodiment, the background image 104 can include one or more synthetic or virtual images that are generated and/or combined (e.g., composited) to represent or simulate various features or characteristics of a real-world or non-real-world environment relative to the object. The synthetic background image can be created to randomize imagery or pixel elements in an image in a real-world location where a specific computer vision sensor may be situated. The synthetic 3D image model 102 of the object and the background image 104 can be selected from a memory device, network storage location, or database. According to an exemplary embodiment, the processing device 100 can obtain one or more background images 104 from a memory location or database and modify the images to create synthesized background image.

The processing device 100 can generate a composite image 106 by combining one or more 3D image models 102 of an object and the one or more background images 104. In generating the composite image 106, the processing device 100 can configure one or more parameters in the set of parameters to render a life-like representation of the object according to properties of the environment depicted in the background image. The one or more parameters can include at least a spatial orientation of the object in the composite image, a distance of the object from the sensor device, lighting conditions associated with the depicted environment in the background image, location of the object in a field of view of the sensor device, and occlusion of the object in the depicted environment. According to an exemplary embodiment the one or more parameters can define physical, temporal, and spatial characteristics or properties of the object including spatial orientation, distance from a simulated sensor location, lighting conditions, location within a sensor's field of view, color depth, Gaussian blur, partial occlusion, brightness, contrast, grain, hue, saturation, tint, signal amplitude, surface imperfections, and other common anomalistic traits that may be experienced from outputs of sensors. In configuring the one or more parameters, the processing device 100 can establish a scene representing an instance in time at which the object is at a specified location in the environment.

Once the composite image 106 has been generated, the processing device 100 can simulate detection of the object by a sensor strategically disposed in the environment. For example, according to an exemplary embodiment, the one or more parameters associated with the composite image 106 can be adjusted to simulate changes in: time, weather (e.g., temperature, precipitation, humidity, cloud cover, etc.), position of the target object, temperature of the target object, position of other distracting objects or features in the environment such as the sun, moon, other man-made structures or objects, or any other properties or parameters of a scene as desired. It should be understood that the one or more parameters can include any parameters for adjusting features of the 3D model of the object and/or the environment via the background image. For example, by adjusting the one or more parameters of the composite image 106, the processing device 100 can simulate reflection or emission of at least one type of radiant energy from the surface of the target object according to a set of parameters associated with at least one of the 3D image model 102 of the object and the background image 104. In addition, the processing device 100 can simulate a reflectance or emittance measurement of the at least one type of radiant energy from the surface of the object by a sensor device configured for detecting the at least one type of radiant energy. The reflectance or emittance measurement of the at least one type of radiant energy from the surface of the object can be simulated at one or more areas or points on the surface of the 3D image model of the object. According to an exemplary embodiment, the processing device 100 can be configured to generate reflectance or emittance measurement by simulating a sensor device configured to detect radiant energy in a visible or invisible spectrum. For example, the processing device 100 can be configured to generate spectrum measurements common in thermal-based sensing, thereby replicating data through physical science analyses to simulate realistic radiant energy. In addition, the processing device 100 can generate imagery data for uncommon capture methods, such as infrared, by approximating these phenomena to potentially simulate alternative radiant effects outside of the common visible spectrum. The processing device 100 can be configured to execute and/or access computational fluid dynamics (CFD) software packages, which are included in the 3D CAD modeling scenarios to show where thermal emissions may be experienced on the 3D image model in simulating real-world and/or non-real-world applications of a target object in an environment.

According to an exemplary embodiment, the simulated sensor device can be an optical or radar sensor. The simulated sensor device can be configured to obtain electromagnetic measurements to generate polar formatted synthetic images for simulating Synthetic Aperture Radar (SAR) data. In performing the polar formatting simulation, the processing device 100 formats the composite image 106 to include an array of points on a surface of the target object. The processing device 100 obtains a simulation result for a plurality of radar transmissions based on the reflectance measurement at one or more target points of the array of points on the 3D image model of the target object for each radar transmission. The reflectance measurement at the one or more target points is performed according to radio reflection principles of the at least one type of radiant energy, the radio reflection principles being based on one or more of dielectric constants of surface materials of the 3D image model and surface angles of the 3D image model, which are included in the set of parameters. The reflectance measurement at the one or more target points for each radar transmission are linked together to obtain one or more simulated images. The processing device 100 assembles the one or more simulated images associated with the simulated radar transmission into an array of 2D images using a series of Fourier transforms. According to a specific implementation involving simulation of a reflectance or emittance measurement via a thermal sensor, the processing device 100 can generate a plurality of 2D images having an overlay of a color gradient over one or more features of the object to characterize thermal emissions of the object according to a simulated real-world application. According to an exemplary embodiment, the processing device 100 can generate annotations that are overlaid or embedded in the plurality of 2D simulated images.

Figure 2:
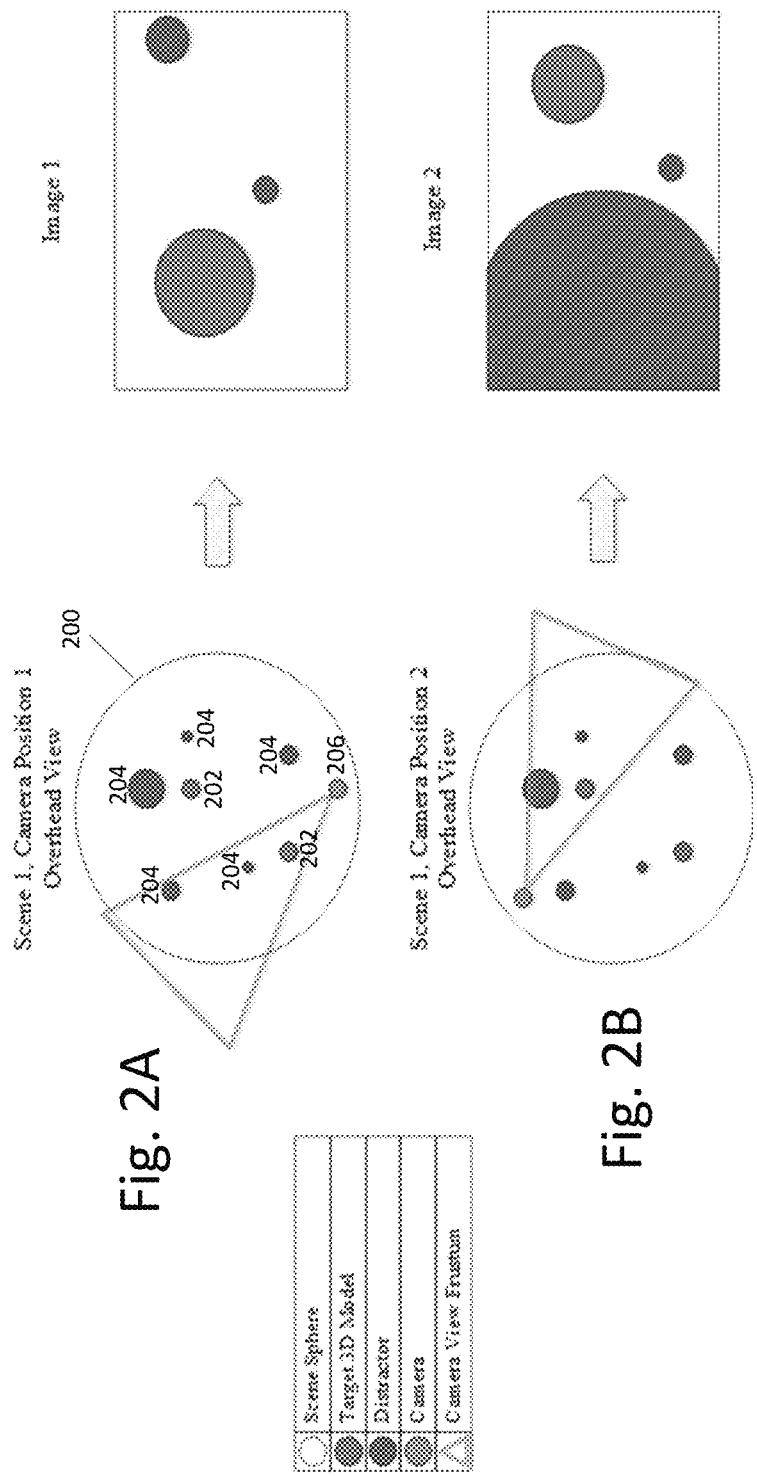
FIGS. 2A and 2B illustrate a process for automating a scene based on sensor movement in according with an exemplary embodiment of the present disclosure.

FIGS. 2A and 2B illustrate a process for simulating movement of a target object according to an exemplary embodiment of the present disclosure. The scene 200 in FIGS. 2A and 2B comprises a common synthetic 3D image model of the object 202 and a background image 204 including one or more distractor objects 204 in an environment which can serve as a distraction or occlusion for detection of the target object 202 by a sensor device 206. For example, the one or more features can include natural or man-made structures such as hills, mountains, trees, shrubs, buildings, vehicles, poles, signs, or any other structures as desired. According to an exemplary embodiment, the one or more features can also include weather patterns such as rain, fog, clouds, sun-light, shadows, lightning, snow, ice, hail, or any other representation of a naturally occurring event as desired. According to another exemplary embodiment, the background image 204 can include one or more unnatural environments or synthetic structures relative to the 3D image model of the object. For example, the background image can depict an environment in which the object would not normally be found, such as an airplane in the room of a home, a ship in a swimming pool, or any other unnatural or non-real-world setting of an object as desired.

As shown in FIG. 2A, the one or more parameters of the scene including properties of the sensor device 206 can be configured so that detection of the target object 202 via the sensor device 206 can be simulated at a time T1. As shown in FIG. 2B, any of the one or more parameters of the scene can be adjusted, including the position of the sensor device 206 and/or the distractor objects 204 relative to the target object 202. The second image can be used to simulate detection of the target object 202 via the sensor device at a time T2. According to an exemplary embodiment, the period between T1 and T2 can be any period suitable for simulating a characteristic or predictive movement of a target object in the environment. Furthermore, the one or more parameters can be adjusted so that portions of the target object 202 can be occluded by one or more features in the environment. Still further, the one or more parameters of the composite image 106 can be adjusted so that as the target object 202 moves, the effect of the movement can be observed in radiant energy reflected or emitted from the surface of the target object 202. The changes in reflection or emission of the radiant energy can be determined by the position of the source of radiant energy relative to the target object 202 whether on or distant from the target object 202, the position of any distractor object 204 relative to one or more sources of radiant energy and the target object 202, the temperature or weather status in the environment, the shape of a component on the target object reflecting or emitting the radiant energy, and any other known or predictable properties which may impact reflection or emission of radiant energy from the target object 202 in a real-world (e.g., natural or realistic) or non-real-world (e.g., unnatural or unrealistic) environment.

Based on the simulation data or simulation result, the processing device 100 can generate a plurality of two-dimensional (2D) simulated images 110 of different perspectives of the target object based on simulation data of the synthetic images. That is, the processing device 100 can be configured to generate a plurality of 2D simulated or synthetic images that depict the target object 202 being detected or observed from one or more perspectives in a real-world or non-real-world environment by a specified sensor 206. In this manner, the processing device 100 can be trained to identify or detect a target object 202 upon a maiden deployment in any environment of interest or perform identification, tracking, and/or detection under non-optimal or adverse conditions or circumstances within any environment of interest.

Figure 3:
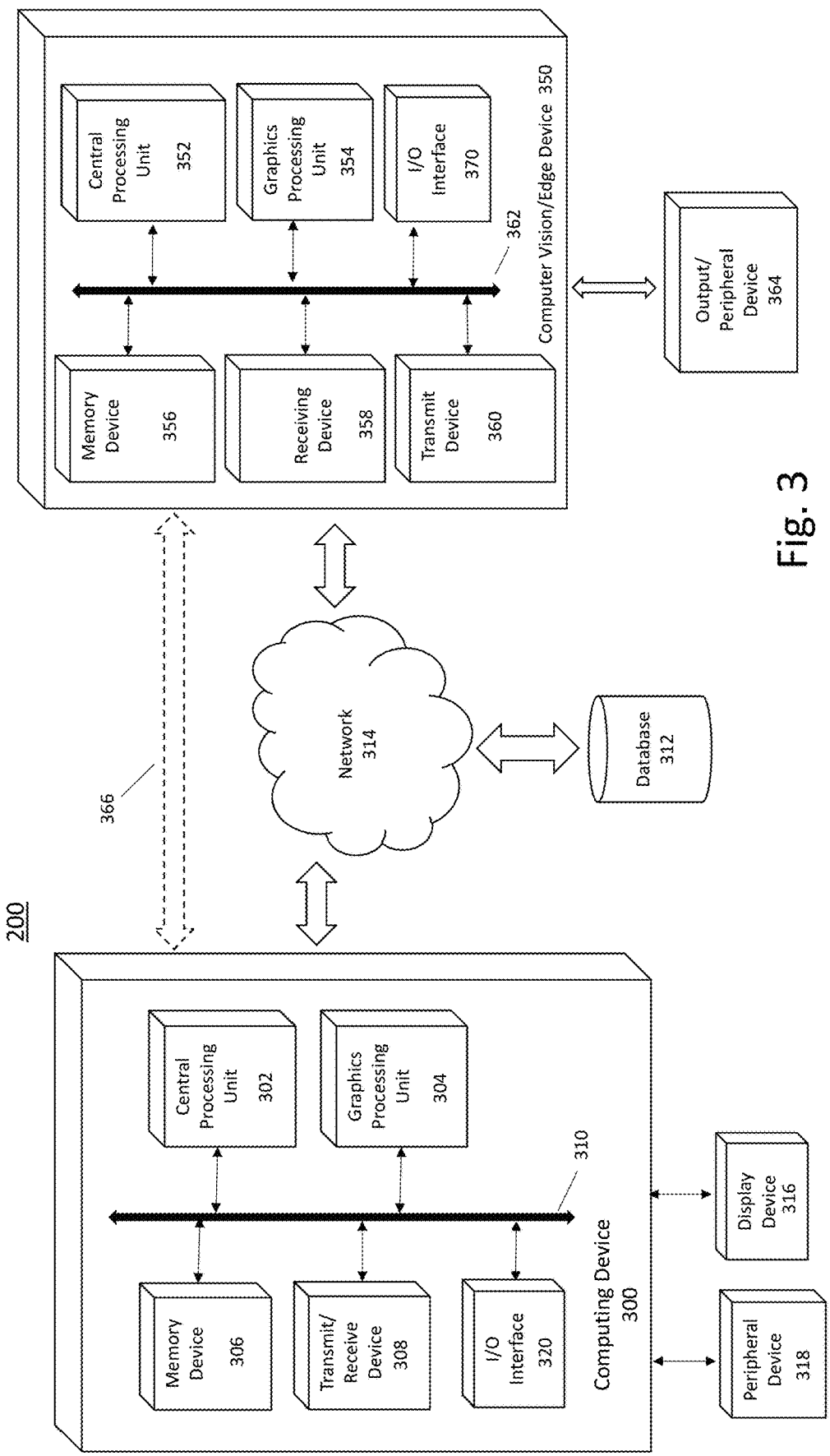
FIG. 3 illustrates a computing device for generating a synthetic image according to an exemplary embodiment of the present disclosure.

FIG. 3 illustrates a processing system for generating a synthetic image according to an exemplary embodiment of the present disclosure.

As shown in FIG. 3, the processing device 100 can be configured as computing device 300, which can include a central processing unit (CPU) 302, a graphics processing unit (GPU) 304, a memory device 306, and a transmit/receive device 308. The CPU 302 can include a special purpose or a general purpose hardware processing device encoded with program code or software for scheduling and executing processing tasks associated with the overall operation of the computing device 300. For example, the CPU 302 can establish the platform necessary for executing one or more 3D CAD software applications or packages. The CPU 302 can be connected to a communications infrastructure 310 including a bus, message queue, network, multi-core message-passing scheme, etc., for communicating data and/or control signals with other hardware components of the computing device 300. According to an exemplary embodiment, the CPU 302 can include one or more processing devices such as a microprocessor, central processing unit, microcomputer, programmable logic unit or any other suitable hardware processing device as desired. The GPU 304 can include a combination of hardware and software components, such as a special purpose hardware processing device being configured to execute or access program code or software for rendering images in a frame buffer for display. For example, the GPU 304 can include an arithmetic logic unit, at least 128 KB of on-chip memory, and be configured with an application program interface such as Vulkan, OpenGL ES (Open Graphics Library for Embedded Systems), OpenVG (OpenVector Graphics), OpenCL (Open Computing Language), OpenGL (Open Graphics Library), Direct3D, or any other suitable hardware and/or software platform as desired for executing a 3D CAD application or process.

According to an exemplary embodiment of the present disclosure, the GPU 304 can be configured to execute and/or access a neural network architecture for generating one or more synthetic 2D images that simulate characteristics or properties of a 3D image model in an environment under varying conditions. For example, the neural network architecture being trained to generate a composite image based on a synthetic 3D rendering of an object and a background image depicting an environment in which the object is located, simulate a reflectance or emittance measurement of radiant energy reflected or emitted from the object by one or more sensor devices, and generate a plurality of 2D simulated images of different perspectives of the object based on a simulation result.

The computing device 300 can also include a memory device 306. The memory device 306 can be configured to store the synthetic 3D image models 102 and/or the background images 104 generated by the GPU 304. According to an exemplary embodiment, the memory device 306 can also be configured to store an object model comprised of a plurality of 2D images resulting from the simulation data. The memory device 306 can include one or more memory devices such as volatile or non-volatile memory. For example, the volatile memory can include random access memory, read-only memory, etc. The non-volatile memory of the memory device 306 can include one or more resident hardware components such as a hard disk drive and a removable storage drive (e.g., a floppy disk drive, a magnetic tape drive, an optical disk drive, a flash memory, or any other suitable device). The non-volatile memory can include an external memory device such as a database 312 connected to the computing device 300 via the network 314. According to an exemplary embodiment, the non-volatile memory can include any combination of resident hardware components or external memory devices. Data stored in computing device 300 (e.g., in a non-volatile memory) may be stored on any type of suitable computer readable media, such as optical storage (e.g., a compact disc, digital versatile disc, Blu-ray disc, etc.) or magnetic tape storage (e.g., a hard disk drive). The stored data can include image data generated by the GPU 304, control and/or system data stored by the CPU 302, and software or program code used by the CPU 302 and/or GPU 304 for performing the tasks associated with the exemplary embodiments described herein. The data may be configured in any type of suitable database configuration, such as a relational database, a structured query language (SQL) database, a distributed database, an object database, etc. Suitable configurations and storage types will be apparent to persons having skill in the relevant art.

The transmit/receive device 308 can include a combination of hardware and software components for communicating with a remote computing device such as a computer vision/edge device 350, another remote device, or the network 314. The transmit/receive device 308 can be configured to transmit/receive data signals and/or data packets over the network 314 according to a specified communication protocol and data format. During a receive operation, the transmit/receive device 308 can identify parts of the received data via the header and parse the data signal and/or data packet into small frames (e.g., bytes, words) or segments for further processing by the CPU 302 or GPU 304. During a transmit operation, the transmit/receive device 308 can assemble data received from the CPU 302 or GPU 304 into a data signal and/or data packets according to the specified communication protocol and/or data format of the network 314 or receiving device. The transmit/receive device 308 can include one or more receiving devices and transmitting devices for providing data communication according to any of a number of communication protocols and data formats as desired. For example, the transmit/receive device 308 can be configured to communicate over the network 314, which may include a local area network (LAN), a wide area network (WAN), a wireless network (e.g., Wi-Fi), a mobile communication network, a satellite network, the Internet, optic fiber, coaxial cable, infrared, radio frequency (RF), or any combination thereof. Other suitable network types and configurations will be apparent to persons having skill in the relevant art. According to an exemplary embodiment, the transmit/receive device 116 can include any suitable hardware components such as an antenna, a network interface (e.g., an Ethernet card), a communications port, a PCMCIA slot and card, or any other suitable communication components or devices as desired.

The computing device 300 can include a display device 316 configured to display one or more interfaces and/or images generated by the CPU 302 and GPU 304. The image data can include the synthetic 3D image model 102, the synthetic or obtained background image 104, and/or the composite image 106, and/or the plurality of 2D synthetic images 110 as generated by the GPU 304. The GPU 304 can be configured to generate a data signal encoded with the video data and send the data signal to the display device 316 via the communications infrastructure 310. The display device 316 can include anyone of various types of displays including light emitting diode (LED), micro-LED, organic LED (OLED), active-matrix organic LED (AMOLED), Super AMOLED, thin film transistor (TFT), TFT liquid crystal display (TFT LCD), in-plane switching (IPS), or any other suitable display type as desired. According to an exemplary embodiment, the display device 316 can be configured to have a resolution at any of 4K, 2K, high definition (HD), full HD, and a refresh rate including any one of 60 Hz, 90 Hz, 120 Hz or any other suitable resolution and refresh rate as desired.

The peripheral device 318 is configured to output the data signal in a format selected by a user. For example, the output device 318 can be implemented as a display device, printer, speaker, or any suitable output device with a desired output format as desired. In addition, the I/O peripheral device 318 can be configured to provide a data signal to the CPU 302 or GPU 304 via the I/O interface 320. According to an exemplary embodiment, the peripheral device 318 can be connected to receive data from the network 314 via computing device 300, and more particularly via the input/output (I/O) interface 320. The I/O interface 320 can include a combination of hardware and software components and be configured to convert the output of the network 314 into a format suitable for output on one or more types of peripheral devices 318.

The computer vision/edge device 350 can include a receiving device 358, which is to receive a plurality of data streams including image data generated by a remote device such as the computing device 300. Each received data stream can include at least a portion of an object model comprising a plurality of synthetic 2D images, the object model being trained based on simulation of a 3D image of an object in real-world and non-real-world scenes, scenarios, or environments. The computer vision/edge device 350 can also include GPU 354 that can be configured to access or execute one or more computer vision applications for identifying or tracking an object in an environment based on features of the object learned from the plurality of synthetic 2D images of the received object model. The GPU 354 can be configured with a neural network for executing the received object model, which can be used to track, detect, and/or identify an object related to the object model in a current environment in which the edge device is or will be deployed. For example, the GPU 354 can input, in the one or more neural networks, the received image into an input layer of the object model so that an object of interest can be detected, identified, and/or tracked. According to an exemplary embodiment, the computer vision device 350 may also be configured to train the received object model. For example, the GPU 354 can compare, in the one or more neural networks, each training image (synthetic image) to one or more reference images of a related object. The GPU 354 may then adjust, in the one or more neural networks, at least one of weights for one or more of a plurality of nodes and connections between one or more of the plurality of nodes based on a degree of correspondence between one or more features of each training image and a selected reference image.

The computer vision/edge device 350 can include a CPU 352 which includes a special purpose or a general purpose hardware processing device encoded with program code or software to control the overall operation of the edge device 350 for performing the exemplary embodiments disclosed herein. The CPU 352 can be connected to a communications infrastructure 362 including a bus, message queue, network, multi-core message-passing scheme, etc. The CPU 352 can include one or more processing devices such as a microprocessor, microcomputer, programmable logic unit or any other suitable hardware processing device as desired.

The computer vision/edge device 350 can also include a memory device 356 which is configured to store software and/or program code for execution by the GPU 354 and the CPU 352. The memory device 356 can include one or more memory devices such as volatile or non-volatile memory. For example, the volatile memory can include random access memory, etc. The non-volatile memory can include a resident memory device such as read-only memory, a hard disk drive and a removable storage drive (e.g., a floppy disk drive, a magnetic tape drive, an optical disk drive, a flash memory, or any other suitable device). The non-volatile memory can also or in the alternative include an external memory device connected to the computing device 102 via the I/O interface 370. Data stored in the computer vision/edge device 350 (e.g., in a non-volatile memory) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer vision/edge device 350 can include a receiving device 358 that can be connected to the computing device 300 via a peer-to-peer connection 366 or through a network 314.

The peer-to-peer connection 366 can be configured for wireless communication without an intermediate device or access point. As already discussed, the network 314 can be configured for wired or wireless communication, which may include a local area network (LAN), a wide area network (WAN), a wireless network (e.g., Wi-Fi), a mobile communication network, a satellite network, the Internet, fiber optic cable, coaxial cable, infrared, radio frequency (RF), another suitable communication medium as desired, or any combination thereof.

The receiving device 358 can include a hardware component such as an antenna, a network interface (e.g., an Ethernet card), a communications port, a PCMCIA slot and card, or any other suitable component or device as desired for effecting communication with the computing device 300, a database 312 for storing digital data, and/or the network 314. The receiving device 358 can be encoded with software or program code for receiving digital data according to one or more communication protocols and data formats. The receiving device 358 can be configured to process and/or format the received data signals and/or data packets by identifying parts of the received data via a header and parse the data signal and/or data packet into small frames (e.g., bits, bytes, words) or segments for further processing in the CPU 352 and GPU 354 via the communication interface 362.

The computer vision/edge device 350 can include a transmit device 360 configured with a combination of hardware and software components for assembling data received from the CPU 352 or GPU 354 into a data signal and/or data packets according to the specified communication protocol and/or data format of the network 314 or receiving device. The transmit device 360 can include one or more receiving devices and transmitting devices for providing data communication according to any of a number of communication protocols and data formats as desired. For example, the transmit device 360 can be configured to communicate over the network 314, which may include a local area network (LAN), a wide area network (WAN), a wireless network (e.g., Wi-Fi), a mobile communication network, a satellite network, the Internet, fiber optics, coaxial cable, infrared, radio frequency (RF), or any combination thereof. Other suitable network types and configurations will be apparent to persons having skill in the relevant art. According to an exemplary embodiment, the transmit device 360 can include any suitable hardware components such as an antenna, a network interface (e.g., an Ethernet card), a communications port, a PCMCIA slot and card, or any suitable processing devices as desired.

The I/O peripheral device 364 is configured to output the data signal in a format selected by a user. For example, the peripheral device 364 can be implemented as a display device, printer, speaker, or any suitable output device with a desired output format as desired. According to an exemplary embodiment, the peripheral device 364 can include or be connected to receive data from the server 120 via an input/output (I/O) interface 370. The I/O interface 370 can include a combination of hardware and software components and be configured to convert the output of the computer vision/edge device 350 into a format suitable for output on one or more peripheral devices 364. For example, the I/O interface 370 can be configured to format a data signal encoded with data generated by the GPU 354 for displaying a graphic of the target object and environmental area of interest on a peripheral device 364 configured as a display device. According to another exemplary embodiment, the peripheral device 364 can be configured to provide a data signal, including image and/or control data, to the CPU 352 or GPU 354 for execution or further processing and/or to memory device 356 for storage.

Figure 4A:
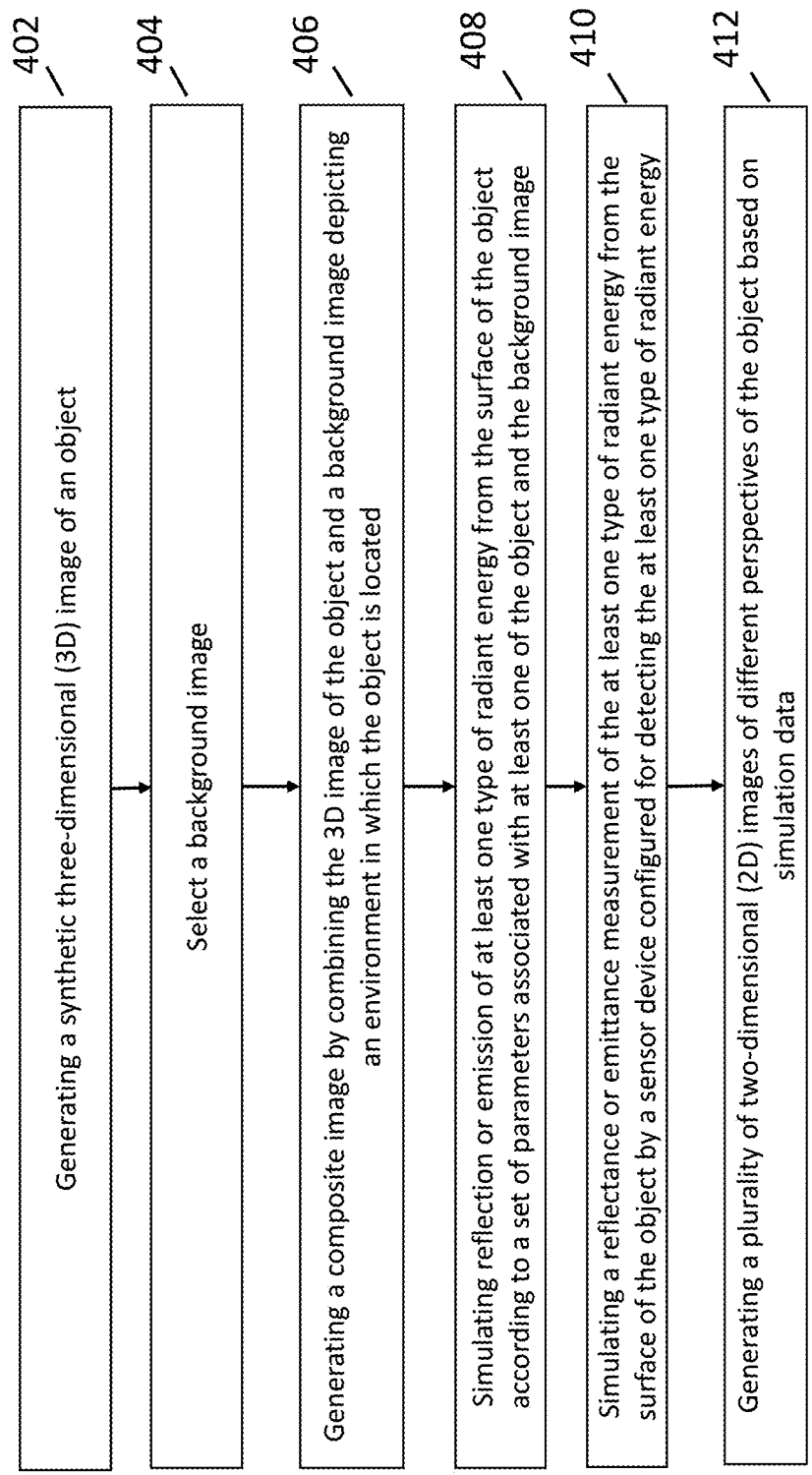
FIG. 4A illustrates a method of generating a synthetic image according to an exemplary embodiment of the present disclosure.

FIG. 4A illustrates a method of generating a synthetic image according to an exemplary embodiment of the present disclosure.

As shown in FIG. 4A, the method 400 includes the step of generating, via a processing device 300, a synthetic three-dimensional (3D) image of an object 102 represented by a 3D image model (Step 402). Next, a background image 104 is selected (Step 404). The background image 104 can include one or more images selected and combined (e.g., composited) from a plurality of images stored in memory device 306 or database 312. As already discussed, the background images 104 can include one or more images captured from a real-world or natural environment or include one or more synthetic or modified images generated to represent or simulate a real-world (e.g., natural or realistic) or non-real-world (e.g., unnatural or unrealistic) environment for the object 102. The method 400 further includes the step of generating, in the processing device 300, a composite image 106 by combining the 3D image model 102 of the object and the background image 104 depicting an environment in which the object is located (Step 406). Once the composite image 106 is generated, the method 400 continues by simulating, in the processing device 300 reflection or emission of at least one type of radiant energy from the surface of the object and/or the background according to a set of parameters associated with at least one of the object of the 3D image model 102 and the background image 104 (Step 408). The processing device 300 also simulates a reflectance or emittance measurement of the at least one type of radiant energy from the surface of the object of the 3D image model 102 by a sensor device configured for detecting the at least one type of radiant energy (Step 410). The method 400 includes the step of generating, via the processing device 300, a plurality of two-dimensional (2D) simulated images of different perspectives of the object of the 3D image model 102 based on simulation data (Step 412).

Figure 4B:
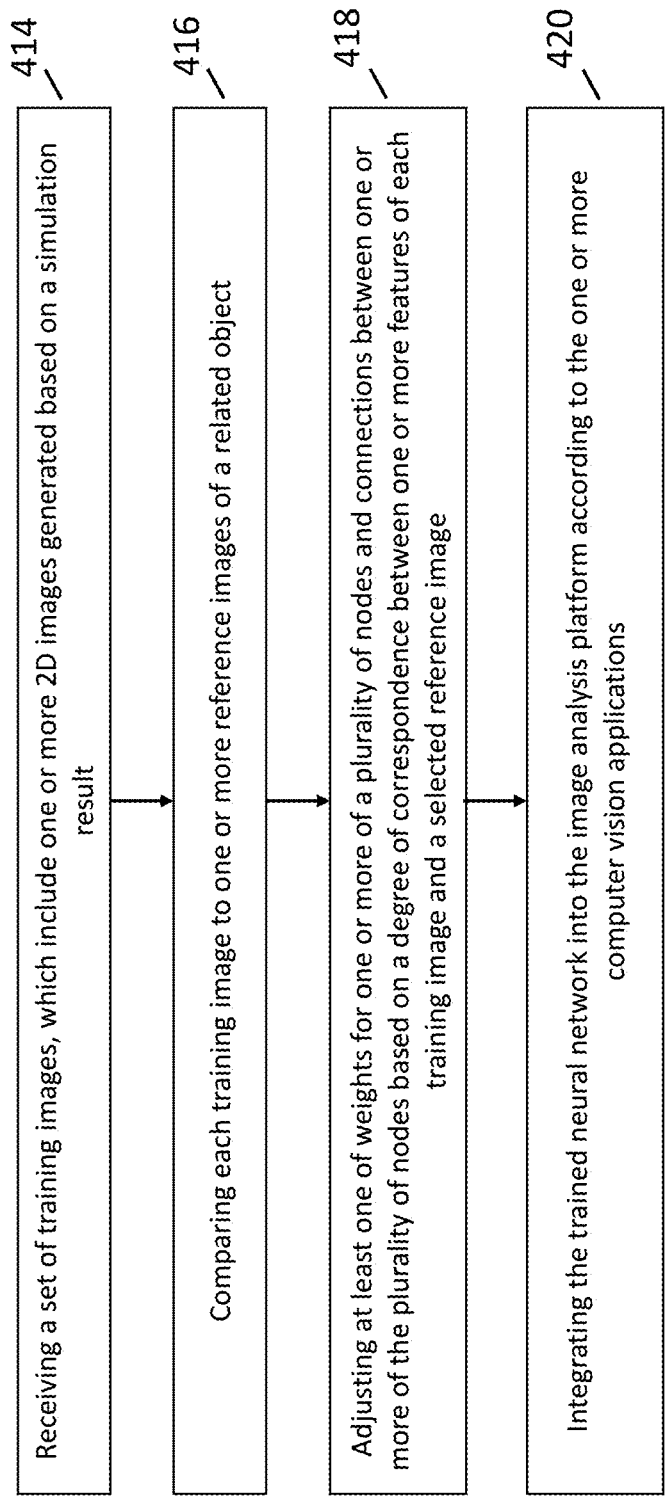
FIG. 4B illustrates a method of training a computing device for generating a synthetic image according to an exemplary embodiment of the present disclosure.

FIG. 4B illustrates a method of training a computing device for generating a synthetic image according to an exemplary embodiment of the present disclosure.

As shown in FIG. 4B, the method 415 includes the step of receiving, in a receiving device of the computer vision system 350, a set of training images, which include one or more 2D simulated images generated based on a simulation result of a processing device 300 (Step 414). The images can be received in the computing vision system 350 over a network 314 or via a peer-to-peer connection. The method 415 includes comparing, in the one or more neural networks of the computer vision system 350, each training image to one or more reference images of a related object (Step 416). The method further includes adjusting, in the one or more neural networks of the computer vision system 350, at least one of weights for one or more of a plurality of nodes and connections between one or more of the plurality of nodes based on a degree of correspondence between one or more features of each training image and a selected reference image (Step 418). Once the nodes in the neural network are adjusted in the computer vision system 350, the trained neural network can be integrated and implemented into the image analysis platform for various tracking, detection, and identification operations of objects according to the one or more computer vision applications (Step 420).

Figure 5:
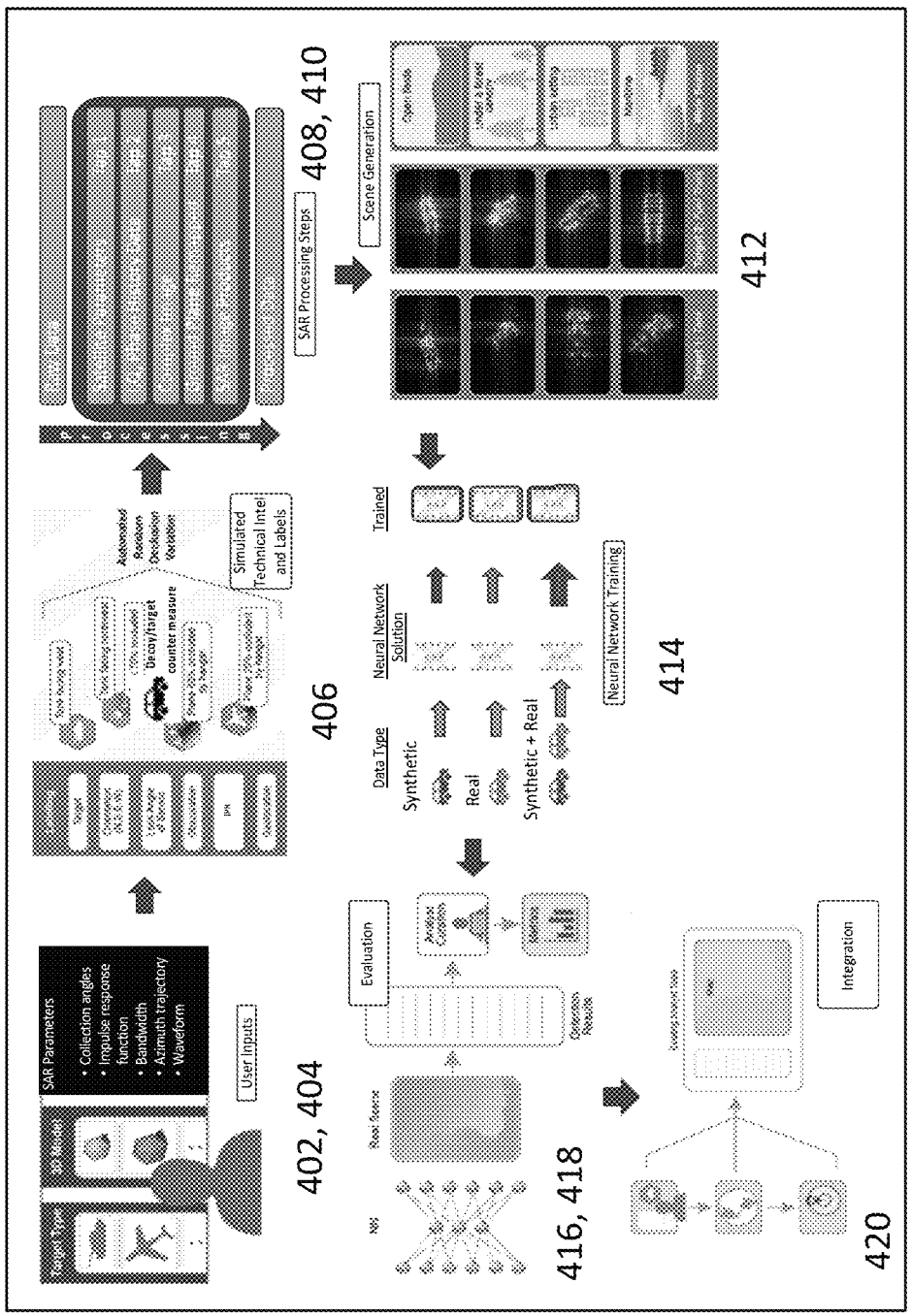
FIG. 5 illustrates a flow diagram illustrating synthetic data generation for synthetic SAR based on the methods of FIGS. 4A and 4B according to an exemplary embodiment of the present disclosure.

FIG. 5 illustrates a flow diagram illustrating synthetic data generation for synthetic SAR based on the methods of FIGS. 4A and 4B according to an exemplary embodiment of the present disclosure.

Figure 6:
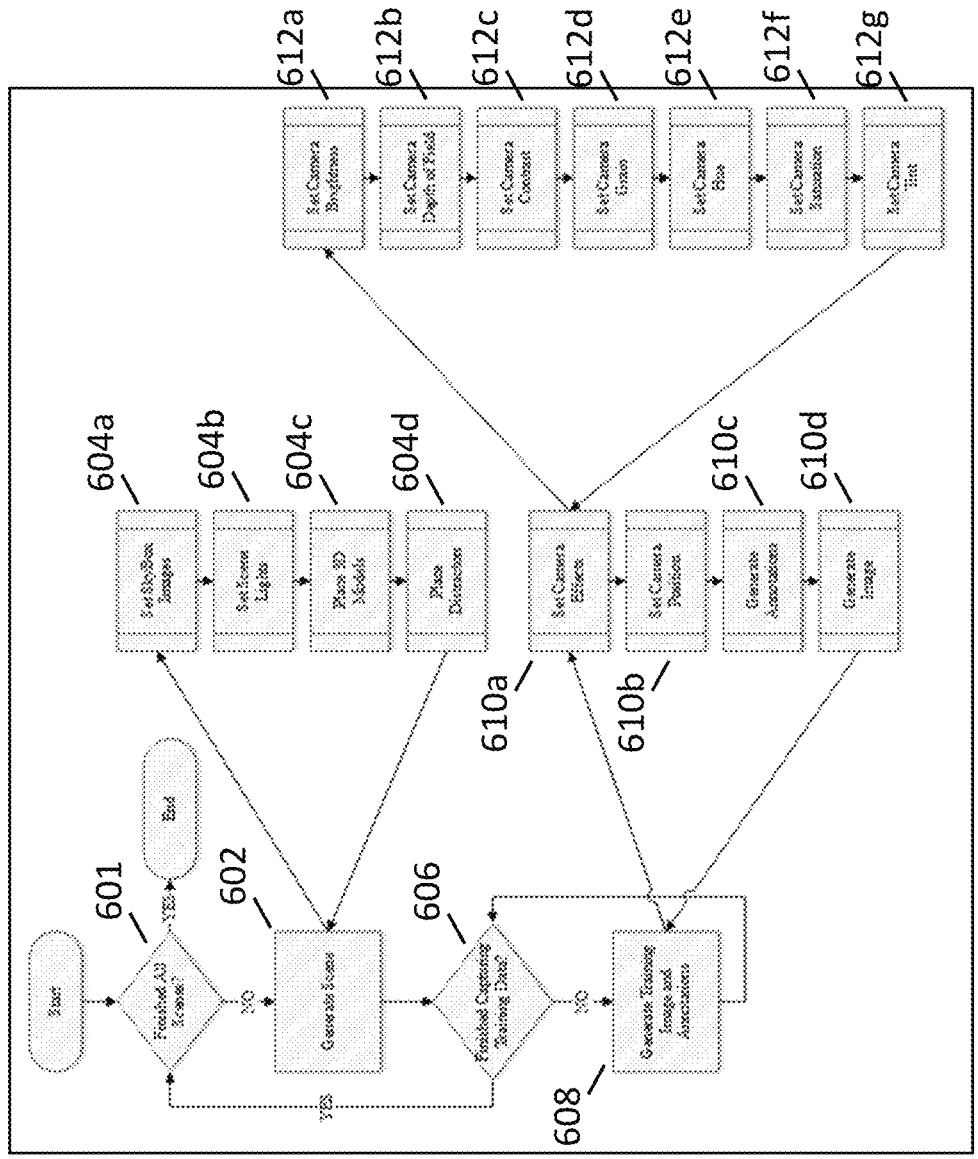
FIG. 6 illustrates a method for generating training image data according to an exemplary embodiment of the present disclosure.

FIG. 6 illustrates a method for generating training image data according to an exemplary embodiment of the present disclosure.

As shown in FIG. 6, the method 600 begins with the processing device 300 prompting an operator or user of the system to determine whether all of the scenes for simulating a synthetic 3D image model in one or more different environments have been generated (Step 601). The method 600 is initiated after the processing device 300 has generated the composite image 106 from the 3D image model 102 and the background image 104. If the operator input is NO, the processing device 300 initiates the process of generating a scene (Step 602). In generating the scene, the processing device 300 prompts the operator to make various adjustments to the composite image by setting SkyBox images (Step 604a), Setting Scene Lights (Step 604b), Placing or Moving 3D Models (Step 604c), and Placing or Moving Distractors (Step 604d). Once the scene is generated, the processing device 300 prompts the operator to determine whether all of the training data has been captured (Step 606). If the determination is YES, the process returns to step 601. If the determination is NO, the processing device 300 initiates the process of generating training image and annotations (Step 608). In generating the training image and annotations, the processing device prompts the operator to adjust various parameters of the sensor device. For example, if the sensor device is a camera, the operator is prompted to Set Camera Effects (Step 610a), which includes one or more of Setting Camera Brightness (Step 612a), Setting Camera Depth of Field (Step 612b), Setting Camera Contrast (Step 612c), Setting Camera Grain (Step 612d), Setting Camera Hue (Step 612e), Setting Camera Saturation (Step 612f), and Setting Camera Tint (Step 612g). Once the Set Camera Effects are configured, the processing device 300 prompts the operator to Set Camera Position (Step 610b), Generate Image Annotations (Step 610c), and Generate the Image (Step 610d). It should be understood that the list of prompts and parameter adjustments for generating the scene (Step 602) and generating the training image and annotations (Step 608) is exemplary and can be expanded to include any number of additional prompts and/or parameter adjustments as desired. Once all of the training data is captured (Step 606) and all the scenes have been generated (Step 600), the process ends. Otherwise, the steps of generating the scene (Step 602) and generating the training image and annotations (Step 608) are repeated as needed.

Figure 7:
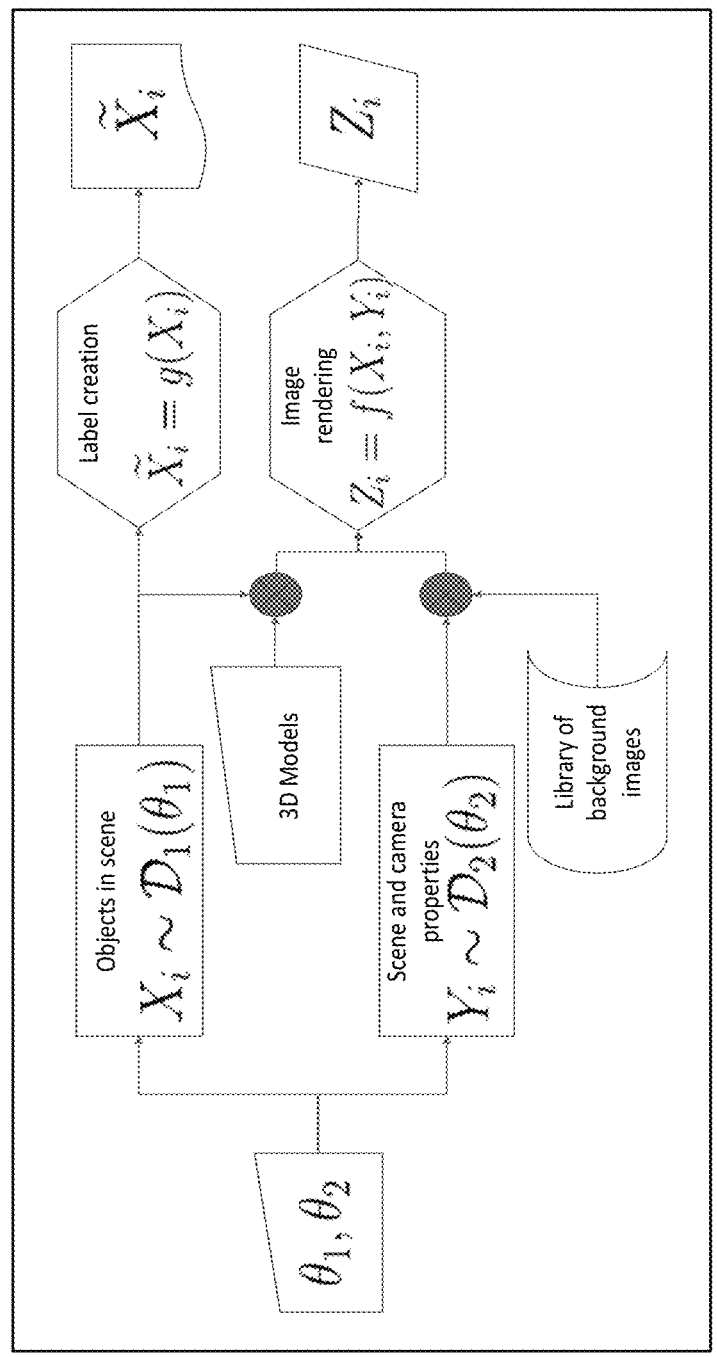
FIG. 7 is a flow diagram representing training image generation mathematically in accordance with an exemplary embodiment of the present disclosure.

FIG. 7 is a flow diagram representing training image generation mathematically in accordance with an exemplary embodiment of the present disclosure.

As shown in FIG. 7, the method 700 for generating training images from 3D models is differentiated and optimized by judicious choice of the distribution $\mathcal{D}_1$ and parameters $\theta_1$ of objects in a scene and the distribution $\mathcal{D}_2$ and parameters $\theta_2$ of the scene and sensor properties. In more detail, the objects in the scene $X_i$ described by $$X_i \sim \mathcal{D}_1(\theta_1) \quad (1)$$

are specified in the exemplary embodiment by $$X_i = \begin{cases} C_{ij} \sim \exp(\lambda) \\ x_{ijk}, y_{ijk}, z_{ijk} \sim \mathcal{N}(0, \sigma^2 I) \\ \phi_{ijk}, \theta_{ijk} \sim \mathcal{U}(0, 2\pi) \end{cases}$$

Here, the count of objects of type j in scene i, $C_{ij}$, is exponentially distributed; $x_{ijk}$, $y_{ijk}$, and $z_{ijk}$ represent the spatial coordinates of object k, k running from 1 to $C_{ij}$, $\mathcal{N}$ is the normal distribution and u is the uniform distribution, the distribution for 3D rotations $\phi_{ijk}$, $\theta_{ijk}$.

Likewise, the scene and sensor properties $Y_i$ for image i are random variables according to:

$$Y_i \sim \mathcal{D}_2(\theta_2) \quad (2)$$

In an analogous manner as $X_i$, the scene properties $Y_i$ are chosen in the exemplary embodiment as:

$$Y_i = \begin{cases} L_i \sim \exp(\lambda) \\ x_{ik}, y_{ik}, z_{ik} \sim \mathcal{N}(0, \sigma^2 I) \\ \phi_i, \theta_i \sim \mathcal{U}(0, 2\pi) \end{cases}$$

Here, $L_i$ is the count of lights in scene i. $x_{ijk}$, $y_{ijk}$, and $z_{ijk}$ represent the spatial coordinates of those lights and of the camera, k running from 1 to $L_i$+1. The 3D rotations only apply to the camera; the light sources are isotropic.

Labels are created for the objects in the scene $X_i$ according to:

$$\tilde{X}_i = g(X_i) \quad (3)$$

As shown in FIG. 7, the objects in the scene $X_i$ are applied through the 3D models and the scene and camera properties $Y_i$ are applied to the one or more background images. The composite image 106 rendered from the combination of the 3D image model of the object 102 and the background image 104 can be defined as:

$$Z_i = f(X_i, Y_i) \quad (4)$$

Where Z is the captured synthetic image represented in pixel values, X represents chosen objects of interest with varying spatial orientations and locations, and Y represents scene permutations (e.g., backgrounds, camera orientations, and lighting). The exemplary embodiments of the present disclosure provide for domain-randomized synthetic data generation in which data samples are derived as a function of the objects of interest and the scene permutations. By treating X and Y as independent variables, an implicit and imperfect representation of P(X,Y) can be sampled. In reality, X and Y are related—most types of objects are typically found in a certain environment and in certain orientations and numbers. For instance, chairs are likely positioned upright and on the floor. The bad representation is close to the true P(X,Y) but is wider, ensuring that corner and low-probability cases are represented in the training data. In another sense, a perfect classifier would be able to identify objects even if they were miscolored or out of their natural environment (e.g., an elephant on the moon). By creating training data in such a "domain randomized" manner, the classifier's performance can be improved on edge cases and it can be taught to reject related but non-essential aspects of an object's typical environment. The solution provided by the claimed embodiment can be contrasted with the use of real photos where a user or operator modifies various pixels in the image to generate synthetic data. This process is labor intensive and would incur high labor and efficiency costs to sample the data for building machine learning algorithms for new media or objects. Another technique for generating realistic or synthetic data by approximating P(X,Y) involves trying to determine the dependence between X and Y either empirically or algorithmically. Using this approach requires placing real-world objects in real-world environments and collecting data during their use. For example, placing cars on the road to learn how to detect a car, or deploying airplanes in the air or at an airport to learn how to detect airplanes. Another salient problem with this family of approaches is that the volume of P(X,Y) is likely to be underestimated. Because of the curse of dimensionality, insufficient overlap makes probability distributions dramatically unreliable in higher dimensions.

The technique described relative to the exemplary embodiments of the present disclosure, however, provide sufficient overlap and addresses real-world random distribution challenges by generating a high probability of uniform samples. Successful instantiation of the software applications via the processing device 300 enables several thousand representative synthetic images to be created for introduction to a deep neural network training application for computer vision model development to interpret outputs from virtually any kind of optical or radar sensor that produces a graphical output to further analyze. The models can then be provided to a computer vision application on an edge computer for processing against live (full motion video) or stored imagery for automated analytics use cases.

From the description of the exemplary embodiments, it should be readily apparent that the methods and systems of the present disclosure can be used to significantly reduce labor involved in creating new libraries (datasets) of computer vision models. The embodiments can enable computer vision systems to act as measurement sensors and broaden and improve detection, classification, and tracking performance of computer vision applications. Moreover, computer vision applications can enable single camera use for detecting an object and measuring its depth to reduce the dependence on sophisticated LiDAR equipment that creates robust (but data-heavy) point cloud measurements of a surrounding environment. The disclosed embodiments may offer alternative approaches to popular Simultaneous Location and Mapping (SLAM) algorithms and can improve the representation of synthetic data outside of the visual spectrum.

According to exemplary embodiments of the present disclosure, the computer vision application can be enhanced if trained to detect, classify, and track newly manufactured objects entering society (vehicles, drones, component parts, etc.). Furthermore, the computer vision application can be trained to recognize newly manufactured components (e.g., Additive Manufacturing) for the purpose of viewing objects in immersive environments (e.g., augmented or other mixed reality headsets). According to yet another exemplary embodiment, the computer vision applications can be trained to detect, classify, and track existing objects that may have limited empirical examples. According to an exemplary embodiment, computer vision applications can be trained to isolate an object of interest in empirical examples for repeated detection in additional environments that influence reflected light on the object of interest. Moreover, according to another exemplary embodiment computer vision applications can be trained to recognize reflected light influencing the object of interest (sunlight, cloud patterns, indoor lighting, other morphological neighboring objects, etc.) to measure the object's absolute location, relative location, or absolute time based on known references provided in the measured material. In another exemplary embodiment of the present disclosure, computer vision applications can be trained to recognize objects of interest through multiple radiant energy methods such as visible, infrared, ultraviolet, electromagnetic, or any other radiant energy method as desired.

Computer vision applications can also be trained to precisely measure position of the CV device (e.g., at its camera lens) relative to the object of interest in terms of X, Y, Z, pitch, roll, and yaw or any other spatial, position, or orientation defining measurements as desired. The computer vision applications can be used in conjunction with a device having multiple sensors where other applications require precision distance measurements relative to an object of interest; and used to assist cameras with known precision position and spatial awareness to determine the exact location of an object relative to the computer vision device location and/or absolute coordinates.

The computer program code for performing the specialized functions described herein can be stored on a computer usable medium, which may refer to memories, such as the memory devices for both the computing device 300 and the computer vision/edge devices 350, which can be memory semiconductors (e.g., DRAMs, etc.). These computer program products can be a tangible non-transitory means for providing software to the various hardware components of the respective devices as needed for performing the tasks associated with the exemplary embodiments described herein. The computer programs (e.g., computer control logic) or software can be stored in the memory device. According to an exemplary embodiment, the computer programs can also be received and/or remotely accessed via the receiving device 308, 358 of the devices 300, 350 as needed. Such computer programs, when executed, can enable the devices 300, 350 to implement the present methods and exemplary embodiments discussed herein, and may represent controllers of the respective devices 300, 350. Where the present disclosure is implemented using software, the software can be stored in a non-transitory computer readable medium and loaded into the computing system 100 using a removable storage drive, an interface, a hard disk drive, or communications interface, etc., where applicable.

The one or more processors of the devices 300, 350 can include one or more modules or engines configured to perform the functions of the exemplary embodiments described herein. Each of the modules or engines can be implemented using hardware and, in some instances, can also utilize software, such as program code and/or programs stored in memory. In such instances, program code may be compiled by the respective processors (e.g., by a compiling module or engine) prior to execution. For example, the program code can be source code written in a programming language that is translated into a lower level language, such as assembly language or machine code, for execution by the one or more processors and/or any additional hardware components. The process of compiling can include the use of lexical analysis, preprocessing, parsing, semantic analysis, syntax-directed translation, code generation, code optimization, and any other techniques that may be suitable for translation of program code into a lower level language suitable for controlling the devices 300, 350 to perform the functions disclosed herein. It will be apparent to persons having skill in the relevant art that such processes result in the devices 300, 350 being specially configured computing devices uniquely programmed to perform the functions discussed above.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning, range, and equivalence thereof are intended to be embraced therein.

What is claimed is:

1. A method for generating synthetic data for computer vision, comprising:
   generating, via a processing device, a synthetic three-dimensional (3D) image of an object;
   selecting a background image;
   generating, in the processing device, a composite image by combining the 3D image of the object and the background image;
   simulating, in the processing device:
      reflection of at least one type of radiant energy from the surface of at least one of the object and the background image according to a set of parameters associated with at least one of the object and the background image; and
      a reflectance measurement of the at least one type of radiant energy from the surface of at least one of the object and background image by a sensor device configured for detecting the at least one type of radiant energy; and
   generating, via the processing device, a plurality of two-dimensional (2D) simulated images of different perspectives of the object based on simulation data.

2. The method of claim 1, wherein the processing device generates the 3D image of the object via a computer-aided design model.

3. The method of claim 1, wherein the step of selecting a background image comprises at least one of selecting and compositing the background image from one or more pre-stored images obtained from a database.

4. The method of claim 1, wherein the step of selecting a background image comprises generating, in the processing device, the background image or modifying, in the processing device, an image from one or more pre-stored images obtained from a database.

5. The method of claim 1, wherein the step of generating the composite image comprises:
configuring one or more parameters in the set of parameters to render a life-like representation of the object according to properties of the environment depicted in the background image, the one or more parameters including at least a spatial orientation of the object in the composite image, a distance of the object from the sensor device, lighting conditions associated with the depicted environment in the background image, one or more sensor parameters relevant to capturing the at least one type of radiant energy of the object, location of the object in a field of view of the sensor device, imperfections on a surface of the object which may alter radiant energy measurement, and occlusion of the object in the depicted environment.

6. The method of claim 1, wherein the reflectance measurement of the at least one type of radiant energy from the surface of the object is simulated at one or more areas or points on the surface of the object.

7. The method according to claim 6, wherein the sensor device can be configured to detect radiant energy in a visible or invisible spectrum.

8. The method according to claim 7, wherein the sensor device is an optical or radar sensor.

9. The method according to claim 8, wherein the sensor device is a Synthetic Aperture Radar and the step of generating a composite image by combining the 3D image of the object and the background image comprises:
formatting the composite image to include an array of points on a surface of the object.

10. The method of claim 9, wherein generating simulated two-dimensional (2D) images of the object comprises:
obtaining a simulation result for a plurality of radar transmissions based on the reflectance measurement at one or more target points of the array of points for each radar transmission;
linking the reflectance measurement at the one or more target points for each radar transmission to obtain one or more simulated images; and
assembling the one or more simulated images associated with the simulated radar transmission into an array of 2D images using a series of Fourier transforms.

11. The method according to claim 10, wherein the reflectance measurement at the one or more target points is performed according to radio reflection principles of the at least one type of radiant energy, the radio reflection principles being based on one or more of dielectric constants of surface materials of the object and surface angles of the object, which are included in the set of parameters.

12. The method of claim 8, wherein the sensor device is an image sensor having one or more adjustable parameters selected from at least color depth, Gaussian blur, brightness, contrast, grain, hue, saturation, tint, and signal amplitude.

13. The method of claim 8, wherein the sensor device is a thermal sensor and generating a plurality of two-dimensional (2D) simulated images of the object based on the simulation results comprises:
overlaying a color gradient over one or more features of the object to characterize thermal emissions of the object according to a simulated real-world application.

14. The method of claim 1, wherein generating one or more 2D simulated images of the object based on the simulation results comprises:
generating annotations that are captured in separate files and associated to each of the plurality of 2D simulated images.

15. The method of claim 1, comprising:
transmitting the 2D simulated images to one or more edge devices deployed in an operational environment.

16. The method of claim 1, wherein the step of simulating, in the processing device, further comprises:
simulating emission of radiant energy emitted from the surface of the object; and
simulating measurement of the radiant energy emitted from the surface of the object by at least one thermal sensor of the one or more sensor devices.

17. A method for training a computer vision system configured with one or more neural networks using synthetic image data, the method comprising:
receiving, in a receiving device of the computer vision system, a set of training images, which include a plurality of 2D simulated images generated based on a simulation result according to claim 1;
comparing, in the one or more neural networks, each training image to a plurality of reference images of a related object; and
adjusting, in the one or more neural networks, at least one of weights for one or more of a plurality of nodes and connections between one or more of the plurality of nodes based on a degree of correspondence between one or more features of each training image and a selected reference image.

18. A computing system, comprising:
a processing device configured to
generate a composite image based on a synthetic 3D rendering of an object and a background image depicting an environment in which the object is located,
simulate a reflectance measurement of radiant energy reflected from at least one of the object and the background image by one or more sensor devices, and
generate a plurality of 2D simulated images of different perspectives of the object based on a simulation result.

19. The system of claim 18, wherein the processing device is further configured to generate a synthetic model of the 3D object comprised of the plurality of 2D simulated images.

20. The system of claim 19, comprising:
a transmitting device configured to send one or more of the plurality of 2D simulated images to an edge device deployed in an operational environment.

21. The system of claim 18, wherein the processing device is further configured to simulate a thermal measurement of radiant energy emitted from a surface of the object by at least one thermal sensor of the one or more sensor devices.

* * * * *